United States Patent [19]

Kingman et al.

[11] 4,060,145
[45] Nov. 29, 1977

[54] LIFT BED TRAILER SUSPENSION SUBFRAME

[75] Inventors: Stephen A. Kingman, Rensselaer; Leslie A. Weaver, Monon, both of Ind.

[73] Assignee: Eugene A. LeBoeuf, Gary, Ind.

[21] Appl. No.: 650,787

[22] Filed: Jan. 20, 1976

[51] Int. Cl.² .............................................. B62D 21/02
[52] U.S. Cl. .................... 280/106 T; 214/512; 280/43.17; 280/423 R
[58] Field of Search .............. 280/106 T, 656, 43.12, 280/423 R, 43.17, 414 R; 214/512, 515, 516, 501, 502

[56] References Cited

U.S. PATENT DOCUMENTS

| 3,130,847 | 4/1964 | Dempster | 214/516 |
| 3,724,697 | 4/1973 | Aruidsson | 214/512 |
| 3,737,061 | 6/1973 | Glumac | 214/515 |
| 3,786,951 | 1/1974 | Ruff | 280/43.17 |
| 3,802,006 | 4/1974 | Nelson | 214/512 |
| 3,861,716 | 1/1975 | Baxter | 280/423 R |

Primary Examiner—Joseph F. Peters, Jr.
Assistant Examiner—John A. Carroll
Attorney, Agent, or Firm—Leydig, Voit, Osann, Mayer & Holt, Ltd.

[57] ABSTRACT

A lift bed highway trailer having a wheeled suspension and adapted to be coupled to a tractor to transport heavy loads through use of pallet frame units that can be quickly picked up and discharged at any point, including a suspension subframe with guide means for maintaining the suspension in alignment with the main frame when the latter is in raised or lowered position, the subframe also including provision for withstanding the thrust of the main frame power lift means.

9 Claims, 6 Drawing Figures

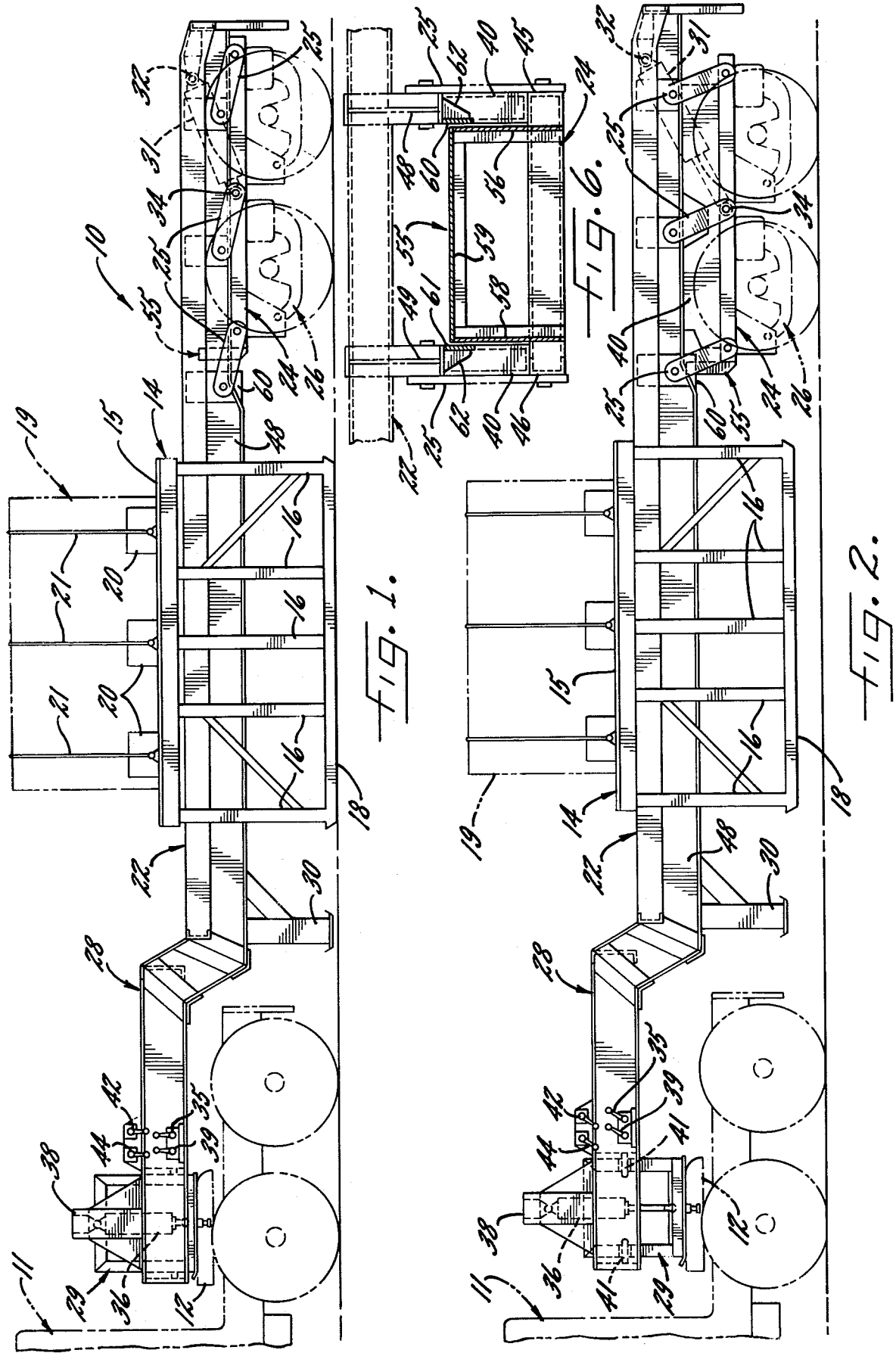

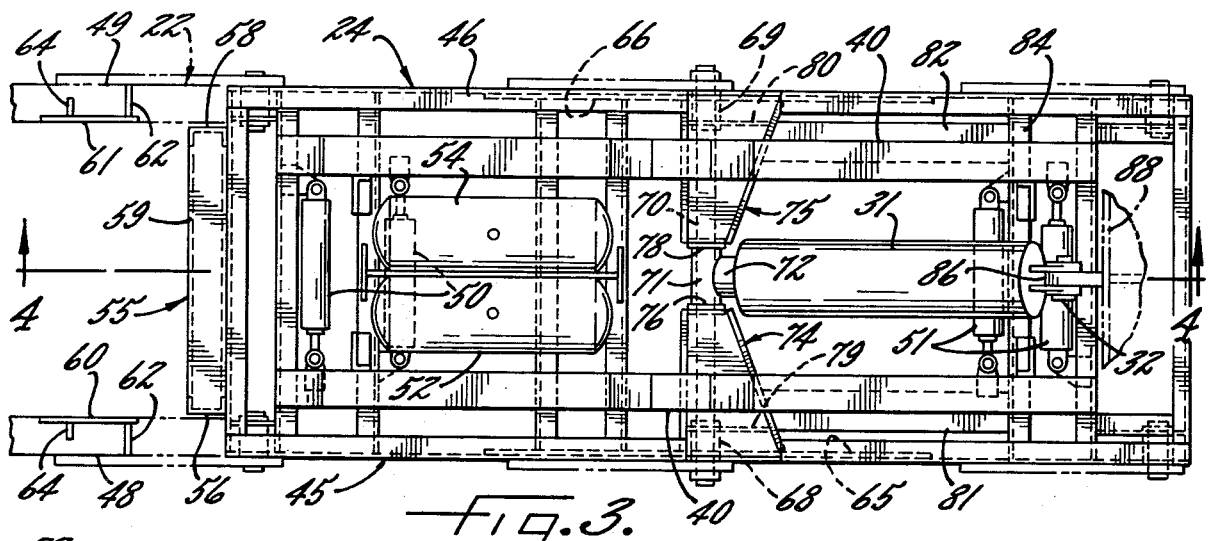

LIFT BED TRAILER SUSPENSION SUBFRAME

DESCRIPTION OF THE INVENTION

The present invention relates to lift bed vehicles of the type adapted to transport heavy loads through the use of pallet frame units that can be quickly picked up and discharged at any desired point. The use of such pallet frame units permits quick separation of the load from the vehicle without waiting for additional equipment or personnel, thereby maximizing the availability of the vehicle for transport rather than storage. More specifically, the invention relates to a life bed highway trailer adapted to be coupled to a tractor by the usual fifth wheel connection and utilizing pallet frame units in transporting heavy loads. The term "highway trailer", as used herein, is intended to include various "off the road" applications where the trailer is used in an industrial complex such as a steel mill or manufacturing plant.

One object of the present invention is to provide a suspension subframe for a lift bed trailer of the type set forth above adapted to travel with complete safety whether in raised transport position or in lowered loading and unloading position.

Another object of the invention is to provide a lift bed trailer of the foregoing character wherein the suspension subframe and liftable main frame are provided with guide means for maintaining the suspension in alignment with the main frame when the latter is in either raised transport position or lowered position.

Another object is to provide a suspension subframe for a lift bed highway trailer of the foregoing type reinforced in a manner adapted to withstand the thrust of an inclined hydraulic actuator connected to the liftable main frame.

Other objects and advantages will become apparent as the following description proceeds, taken together with the accompanying drawings, in which:

FIG. 1 is a side elevational view of a lift bed trailer embodying the present invention, the trailer being in lowered position and backed under a loaded pallet frame unit preparatory to picking it up;

FIG. 2 is a view similar to FIG. 1 but showing the lift bed trailer and load in raised or transport position with the loaded pallet frame unit in place thereon;

FIG. 3 is an enlarged plan view of the rearward portion of the trailer of FIG. 1 showing the subframe, suspension guide means, and a portion of the liftable main frame overlying the subframe.

FIG. 4 is a vertical sectional view taken longitudinally through the suspension subframe, in the plane of the line 4—4 in FIG. 3, with the main frame in lowered position.

FIG. 5 is a view similar to FIG. 3 but with the main frame in raised transport position.

FIG. 6 is a vertical sectional view taken transversely through the suspension guide means, in the plane of the line 6—6 in FIG. 4.

While the invention is susceptible of various modifications and alternative constructions, a certain illustrative embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

Referring more specifically to FIG. 1, the invention is there exemplified in an illustrative lift bed trailer 10 arranged to be coupled to a tractor 11 by means of a conventional fifth wheel connection 12. The trailer 10 is adapted to transport heavy loads through the use of one or more pallet frame units 14 that can be quickly picked up and quickly discharged at any desired point, thus maximizing the availability of the trailer for transport rather than storage. The pallet frame unit 14 is designed to straddle the bed of the trailer and the latter, when in loading or unloading position, may be moved freely under the unit 14.

The pallet frame unit 14 in this instance is fashioned as a weldment comprising a load carrying platform 15 supported on two laterally spaced sets of legs 16. Each set has a ground engaging skid 18 fixed to the lower ends of the legs. The skid and legs are made from relatively heavy steel tubing of square or rectangular cross section, while the platform 15 may be formed by transverse I-beams and appropriate steel or wood decking. The two sets of legs 16 are spaced a sufficient distance apart to straddle the trailer bed, with adequate clearance on each side to permit the trailer to be easily backed under the platform 15. The latter may, for example, support a steel coil 19 thereon by means of chocks 20 and tie-down bands or chains 21. The coil 19 may weigh up to 50,000 pounds.

The trailer 10 comprises a liftable main frame or bed 22 of generally rectangular configuration and constructed of relatively heavy steel structural members. The main frame 22 is connected at its rearward end to a subframe 24 by a plurality of pivot arms 25. The subframe 24 is ground supported through an underlying wheeled suspension 26. The forward end of the main frame 22 is rigidly fixed to a gooseneck 28 which includes a jackbox 29 adapted to engage the fifth wheel of the tractor 11. The forward end of the main frame 22 also includes a pair of landing legs 30 for supporting it when the trailer is detached from the tractor.

For the purpose of shifting the main frame 22 of the trailer between a lowered loading and unloading position (FIGS. 1 and 4), and a raised transport position (FIGS. 2 and 5), the trailer 10 is provided with a pair of independent hydraulic actuators of the conventional double acting type. These include hydraulic actuator 31 connected between a pivot point 32 on the main frame 22 and a pivot point 34 on the subframe 24. The actuator 31 is operated from the hydraulic system of the tractor by means of control valve 35 on the gooseneck and is adapted to raise and lower the rearward end portion of the main frame 22. The other actuator 36 is interposed between the bottom of the jackbox 29 and a yoke 38 fixed to the upper portion of the gooseneck 28, the jackbox and gooseneck being vertically movable relative to each other. The actuator 36 is operated from the hydraulic system of the tractor by means of control valve 39 also located on the gooseneck and is adapted to raise and lower the forward end portion of the main frame.

The main frame 22 may be positively locked in raised transport position by the use of quick acting, power actuated locking mechanisms including devices 40, 41 in the trailer subframe 24 and in the gooseneck structure 28. The locking mechanism in the suspension subframe 24 is controlled by valve 42 on the gooseneck, while the locking mechanism in the gooseneck structure is controlled by the valve 44, also on the gooseneck. Power for both mechanisms is supplied by the compressed air system of the tractor.

The locking devices 40 associated with the suspension subframe 24 (FIGS. 2-6) comprise a pair of longitudinally disposed lift spacers situated in laterally spaced relation on the top surface of the subframe 24. The lift spacers 40 are adapted to be laterally shifted between an inboard or retracted position, shown in FIGS. 3 and 4, and an outboard or extended position, shown in FIGS. 5 and 6. In the extended position, the spacers 40 overlie the side channels 45, 46 of the subframe 24 and underlie fore and aft I-beams 48, 49 of the liftable main frame 22 to support the latter in raised transport position. In their retracted position, the spacers 40 remain clear of the main frame I-beams 48, 49 when the main frame is in lowered position for loading and unloading. Each of the lift spacers 40 has a pair of actuators 50, 51 (FIG. 3) for shifting it laterally and is closely guided during its lateral movement. The actuators are powered from the compressed air system of the tractor and the circuit may include accumulator tanks 52, 54 (FIGS. 3-5) mounted within the liftable frame 22 of the trailer.

In a vehicle such as the trailer 10, there is a tendency for the wheeled suspension 26 to wobble or skew, particularly when traveling around a curve with the main frame 22 in the raised transport position as shown in FIGS. 2, 5 and 6. While the pivoted connecting links 25 provide a relatively strong connection between the subframe 24 and the main frame 22 when the latter is in lowered position, the links 25 are unlikely to provide sufficient resistance to skewing of the wheeled suspension to assure the safety of the trailer when the main frame is in raised position. For the purpose of overcoming this problem, guide means are interposed between the suspension frame 24 and the liftable main frame 22 (FIGS. 3-6). The guide means in the present instance comprises an upstanding transverse guide 55 fixed to the forward end of the suspension frame and defining a pair of laterally spaced, upstanding guide abutments 56, 58. The latter may be formed from channel sections with their flanges turned toward the center line of the trailer and may be reinforced at their upper ends by a cross member 59 of similar cross section having down-turned flanges. The guide means also includes a pair of cooperating guide abutments 60, 61 mounted on the lower flanges of the main frame I-beams 48, 49 in the transition area between the section over the suspension frame 24 and the deeper section extending forwardly therefrom. In this case, the guide abutments 48, 49 happen to be fashioned as generally triangular plates mounted flush with the respective inner edges of the lower flanges of the beams 48, 49. The abutments 60, 61 may be reinforced by gussets 62, 64 and are situated so that they will be in relatively closely spaced, opposed relation when the main frame is in raised transport position as shown in FIGS. 2, 5 and 6. A spacing of, for example, one-fourth inch between the abutments 56, 60 and 58, 61 has been found to be adequate.

With the guide structure just described, and the main frame 22 in raised transport position, it will be appreciated that skewing or wobbling of the wheeled suspension is effectively counteracted by coaction between the opposed sets of guide abutments 56, 60 and 58, 61. When the main frame 22 is in lowered position, skew or wobble is not as large a problem because the pivot links 25 are more nearly horizontal and provide much more resistance than they do in transport position. In any event, such skew or wobble as may occur in lowered position (shown in FIGS. 1 and 4) is counteracted by engagement between the inner edges of the lower flanges of I-beams 48, 49 and the suspension guide abutments 56, 58.

Referring more specifically to the structure of the subframe 24 and its connections to the liftable main frame 22 (FIGS. 3-5), it will be noted that the subframe 24 has a vertical dimension substantially smaller than that of said main frame and the actuator 31 is disposed at a small angle to the horizontal, due to limitations of vertical space and compactness. Consequently, when lifting the main frame 22 on the pivot links 25 with a given load on the main frame, the actuator 31 must exert a force substantially greater than the weight of the load. For example, in a vehicle such as the trailer 10 with a 50,000 pound load on the main frame 22 and an actuator 31 with an 8 inch diameter piston, it has been found that 1200 pounds per square inch of hydraulic pressure on the actuator 31, generating an actuator force exceeding 60,000 pounds, is necessary to initiate lift. In other words, under these conditions, the actuator 31 is exerting a thrust in excess of 60,000 pounds on the subframe 24 and the main frame 22.

In order to withstand the lifting stress of the actuator 31 under the height limitations applicable to the suspension, provision is made for reinforcing the subframe 24 within its own general plane. For this purpose, the side walls of the side members 45, 46 of the subframe are stiffened by a pair of long tapered plates 65, 66 fixed thereto (FIGS. 3-5). The members 45, 46 and the plates 65, 66 have axially alined openings which house annular bushings 68, 69. The latter support a pivot shaft 70 for the actuator 31, the shaft 70 engaging cross head 71 of actuator piston rod 72. The actuator pivot shaft 70 is directly reinforced against bending by a pair of bone-like shoulders 74, 75 cantilevered inwardly from the subframe side members 45, 46. The pivot shaft 70 extends through supporting apertures in the shoulder end walls 76, 78 adjacent the cross head 71. The shaft bushings 68 are also reinforced by internal ribs 79, 80 within the shoulders 74, 75. The later, in turn, are reinforced by means of a pair of box beams 81, 82 disposed longitudinally of the subframe and extending between transverse member 84 and respective ones of the shoulders 74, 75.

The upper end of the actuator 31 is pivotally secured to the rearward end portion of the main frame by means of pin 85 and a heavy apertured bracket 86. The latter is supported on a massive transverse box beam 88 housed within the main frame 22, the bracket and beam being constructed and arranged to withstand the lifting thrust of the actuator 31.

We claim as our invention:

1. In a lift bed highway trailer adapted for attachment to a tractor, the combination comprising:
 a. a liftable main frame having a lowered loading and unloading position and a raised transport position;
 b. a subframe underlying said main frame and pivotally connected to same, said subframe having a pair of spaced apart side members;
 c. a wheeled suspension underlying said subframe and adapted to serve as a ground support therefor;
 d. a pair of main structural members secured in underlying relation with said main frame and spaced laterally from each other so as to overlie the side members of said subframe;
 e. an upstanding transverse guide mounted on the forward end of said subframe and defining a pair of guide abutments situated in relatively closely spaced relation to said longitudinal structural members of said liftable main frame;
f. a pair of guide abutments on said main frame structural members disposed in opposed and relatively closely spaced relation with said suspension guide abutments;
g. an actuator for moving said main frame relative to said subframe between the lowered loading and unloading position and the raised transport position;
h. a pair of reinforcing shoulders projected inwardly from said side members of said subframe;
i. a pair of longitudinally extending reinforcing beams connected between said shoulder members and a transverse structural member of said subframe; and
j. a pivot shaft extending through said shoulder members and one end of said actuator, whereby said pivot shaft and subframe are adapted to withstand the lifting thrust of said actuator.

2. In a lift bed highway trailer adapted for attachment to a tractor, the combination comprising:
a. a liftable main frame having a lowered loading and unloading position and a raised transport position;
b. a loaded pallet frame unit adapted to straddle said main frame;
c. a subframe underlying and pivotally connected to said main frame, said subframe having a vertical dimension substantially smaller than that of said main frame;
d. a wheeled suspension underlying said subframe and adapted to serve as a ground support therefor;
e. a pair of main structural members secured in underlying relation with said main frame and spaced laterally from each other so as to overlie said subframe;
f. a pair of upstanding guide abutments mounted on the forward end of said subframe in relatively closely spaced relationn to said longitudinal structural members of said liftable main frame;
g. a pair of guide abutments on said main frame structural members disposed in opposed and relatively closely spaced relation with said suspension guide abutments when said main frame is in raised transport position;
h. an actuator for moving said main frame relative to said subframe between the lowered loading and unloading position and the raised transport position;
i. a pair of reinforcing shoulders projected inwardly from said side members of said subframe;
j. a pair of longitudinally extending reinforcing beams connected between said shoulder members and a transverse structural member of said subframe; and
k. a pivot shaft extending through said shoulder members and one end of said actuator, whereby said pivot shaft and subframe are adapted to withstand the lifting thrust of said actuator.

3. In a lift bed highway trailer adapted for attachment to a tractor, the combination comprising:
a. a liftable main frame having a lowered loading and unloading position and a raised transport position;
b. a subframe underlying said main frame and pivotally connected to same, said subframe having a pair of spaced apart side members and a vertical dimension substantially smaller than that of said main frame;
c. a wheeled suspension underlying said subframe;

d. a pair of main structural members secured in underlying relation with said main frame and spaced laterally from each other so as to overlie the side members of said subframe;
e. a first pair of guide abutments mounted on the forward end of said subframe in relatively closely spaced relation to said longitudinal structural members of said liftable main frame;
f. a second pair of guide abutments mounted on said main frame structural members substantially flush with the inner edges thereof and disposed in opposed and relatively closely spaced relation with said suspension guide abutments; and
g. power lift means for moving said main frame relative to said subframe between the lowered loading and unloading position and the raised transport position.

4. The combination set forth in claim 3 wherein said main frame structural members are I-beams and said second pair of guide abutments are respectively mounted on the lower flanges of the I-beams.

5. In a lift bed highway trailer adapted for attachment to a tractor, the combination comprising:
a. a liftable main frame having a lowered loading and unloading position and a raised transport position;
b. a loaded pallet frame unit adapted to straddle said main frame;
c. a subframe underlying and pivotally connected to said main frame, said subframe having a vertical dimension substantially smaller than that of said main frame;
d. a wheeled suspension underlying said subframe;
e. a pair of main structural members secured in underlying relation with said main frame and spaced laterally from each other so as to overlie said subframe;
f. a first pair of guide abutments mounted on one end of said subframe is relatively closely spaced relation to said longitudinal structural members of said liftable main frame;
g. a second pair of guide abutments on said main frame structural members disposed in opposed and relatively closely spaced relation with said suspension guide abutments when said main frame is in raised transport position; and
h. power lift means interposed at an acute angle between said main frame and said subframe for moving said main frame relative to said subframe between the lowered loading and unloading position and the raised transport position.

6. The combination set forth in claim 5 wherein the first pair of guide abutments is mounted on the front end of said subframe, and said first pair of guide abutments are connected by a cross member.

7. The combination set forth in claim 5 wherein said first pair of guide abutments are of channel cross section and said second pair of abutments are mounted flush with the inner edges of said main frame structural members.

8. In a lift bed highway trailer adapted for attachment to a tractor, the combination comprising:
a. a liftable main frame having a lowered loading and unloading position and a raised transport position;
b. a subframe underlying said main frame and pivotally connected to same, said subframe having a pair of spaced apart side members and a vertical dimension substantially smaller than that of said main frame;

c. a wheeled suspension underlying said subframe;

d. an actuator interposed at an acute angle between said main frame and said subframe for moving said main frame relative to said subframe between the lowered loading and unloading position and the raised transport position;

e. a pair of reinforcing shoulders projected inwardly from said side members of said subframe;

f. a pair of longitudinally extending beams connected between said shoulder members and a transverse structural member of said subframe; and g. a pivot shaft extending through said shoulder members and one end of said actuator, whereby said pivot shaft and subframe are adapted to whithstand the lifting thrust of said actuator.

9. The combination set forth in claim 8, which further comprises a loaded pallet frame unit adapted to straddle said main frame, and said shoulder members include reinforced bushings and supports for said pivot shaft.